US011350611B2

(12) United States Patent
Zimmerer

(10) Patent No.: US 11,350,611 B2
(45) Date of Patent: Jun. 7, 2022

(54) BATTERY CAGE FOR POULTRY FARMING

(71) Applicant: Salmet GmbH & Co. KG, Ittlingen (DE)

(72) Inventor: Gregor Zimmerer, Heusenstamm (DE)

(73) Assignee: Salmet GmbH & Co. KG, Ittlingen (DE)

( * ) Notice: Subject to any disclaimer, the term of this patent is extended or adjusted under 35 U.S.C. 154(b) by 0 days.

(21) Appl. No.: 16/981,787

(22) PCT Filed: May 14, 2019

(86) PCT No.: PCT/DE2019/100435
§ 371 (c)(1),
(2) Date: Sep. 17, 2020

(87) PCT Pub. No.: WO2019/238156
PCT Pub. Date: Dec. 19, 2019

(65) Prior Publication Data
US 2021/0112782 A1  Apr. 22, 2021

(30) Foreign Application Priority Data
Jun. 12, 2018 (DE) .................... 10 2018 114 037.1

(51) Int. Cl.
*A01K 31/00* (2006.01)
*A01K 31/04* (2006.01)
(52) U.S. Cl.
CPC ............ *A01K 31/005* (2013.01); *A01K 31/04* (2013.01)
(58) Field of Classification Search
CPC . A01K 31/005; A01K 31/04; A01K 31/17–20
See application file for complete search history.

(56) References Cited

U.S. PATENT DOCUMENTS 2,097,293 A * 10/1937 Kent .................... A01K 31/005
119/309
2,448,120 A * 8/1948 Petraske ................ A01K 31/04
119/458

(Continued)

FOREIGN PATENT DOCUMENTS

DE    37 15 735 A1    11/1988
DE    196 34 126 A1    2/1997
(Continued)

OTHER PUBLICATIONS

International Search Report in PCT/DE2019/100435, dated Aug. 21, 2019.

(Continued)

*Primary Examiner* — Timothy D Collins
*Assistant Examiner* — Nicholas Leo Seneczko
(74) *Attorney, Agent, or Firm* — Collard & Roe, P.C.

(57) ABSTRACT

A poultry-farming battery cage farming has at least two horizontal cage rows, formed with cage enclosures, arranged alongside one another, that are formed with double cages made up of cages that back on to one another. Under each row extends a droppings receptacle, over which air-fanning flaps are longitudinally spaced apart, each air-fanning flap having an upper force-transmission part and a lower fan part mounted on a transverse axis arranged near an upper air-fanning-flap end. The two cages of each double cage have cage bottoms extending away from one another transversely and are separated from one another by a common vertical longitudinal rear wall arranged at a vertical spacing above the upper air-flap end. The fan part of the air-fanning flap is arranged under the associated cage bottoms. The air-fanning-flap end is arranged in a double-cage area, from which the cage bottoms extend away from one another transversely.

3 Claims, 5 Drawing Sheets

(56) References Cited

U.S. PATENT DOCUMENTS

| | | | | |
|---|---|---|---|---|
| 2,601,844 A * | 7/1952 | Lovell | A01K 31/04 | 119/458 |
| 2,700,369 A * | 1/1955 | Morris | A01K 31/17 | 119/458 |
| 2,970,567 A * | 2/1961 | Sol | A01K 31/04 | 119/458 |
| 3,134,358 A * | 5/1964 | Byrnes | A01K 1/035 | 119/458 |
| 3,159,139 A * | 12/1964 | Haggard | A01K 1/0227 | 119/457 |
| 3,312,194 A * | 4/1967 | Ernst | A01K 39/01 | 119/457 |
| 3,319,606 A * | 5/1967 | Florence | A01K 31/04 | 119/57.2 |
| 3,396,702 A * | 8/1968 | Trussell | A01K 31/18 | 119/455 |
| 3,550,558 A * | 12/1970 | Sachs | A01K 1/031 | 119/456 |
| 3,658,031 A * | 4/1972 | Coe | A01K 1/03 | 119/457 |
| 3,707,141 A * | 12/1972 | Boer | A01K 31/04 | 119/458 |
| 3,727,582 A * | 4/1973 | Heying | A01K 31/17 | 119/478 |
| 3,768,442 A * | 10/1973 | Van Huis | A01K 31/17 | 119/457 |
| 3,783,829 A * | 1/1974 | Siciliano | A01K 31/04 | 119/455 |
| 3,978,819 A * | 9/1976 | Lovitt | A01K 1/035 | 119/458 |
| 4,009,685 A * | 3/1977 | Sojka | A01K 1/0152 | 119/458 |
| 4,212,269 A * | 7/1980 | White | A01K 31/17 | 119/458 |
| 4,242,809 A * | 1/1981 | Elder | A01K 31/04 | 119/442 |
| 4,321,887 A * | 3/1982 | Martin | A01K 31/04 | 119/458 |
| 4,474,137 A * | 10/1984 | Walters | A01K 31/005 | 119/458 |
| 4,697,547 A * | 10/1987 | Malestein | A01K 1/03 | 119/457 |
| 5,007,379 A * | 4/1991 | Lackner | A01K 31/005 | 119/455 |
| 5,179,912 A * | 1/1993 | Wu | A01K 31/04 | 119/442 |
| 5,570,657 A * | 11/1996 | Kuhlmann | A01K 31/005 | 119/458 |
| 5,901,665 A * | 5/1999 | Lackner | A01K 31/04 | 119/458 |
| 6,854,424 B2 * | 2/2005 | Bauman | A01K 1/034 | 119/436 |
| 6,968,807 B2 * | 11/2005 | Kuhlmann | A01K 31/04 | 119/458 |
| 7,036,458 B1 * | 5/2006 | Stornant | A01K 1/011 | 119/453 |
| 7,389,745 B2 * | 6/2008 | Weaver | A01K 31/002 | 119/440 |
| 8,714,110 B2 * | 5/2014 | Savoia | B25J 15/0253 | 119/452 |
| 2004/0144329 A1 * | 7/2004 | Kuhlmann | A01K 31/17 | 119/458 |
| 2011/0054669 A1 * | 3/2011 | Savoia | B25J 15/0253 | 700/218 |
| 2017/0369384 A1 * | 12/2017 | Themann | C02F 11/12 | |
| 2019/0327940 A1 * | 10/2019 | Otto-Lubker | A01K 31/04 | |

FOREIGN PATENT DOCUMENTS

| | | |
|---|---|---|
| EP | 0 387 819 A1 | 9/1990 |
| EP | 0 740 900 A1 | 11/1996 |
| ES | 2 065 788 A1 | 2/1995 |
| FR | 2693628 A1 | 1/1994 |
| JP | S50-2878 U | 1/1975 |
| JP | H07-289111 A | 11/1995 |

OTHER PUBLICATIONS

English translation of the International Preliminary Report on Patentability and Written Opinion of the International Searching Authority in PCT/DE2019/100435, dated Dec. 15, 2020.

* cited by examiner

BATTERY CAGE FOR POULTRY FARMING

CROSS REFERENCE TO RELATED APPLICATIONS

This application is the National Stage of PCT/DE2019/100435 filed on May 14, 2019, which claims priority under 35 U.S.C. § 119 of German Application No. 10 2018 114 037.1 filed on Jun. 12, 2018, the disclosure of which is incorporated by reference. The international application under PCT article 21(2) was not published in English.

The invention relates to a battery cage for poultry farming with the following features:
- at least two horizontal cage rows formed with cage enclosures are arranged adjacent to one another;
- a plurality of the cage enclosures is formed with double cages consisting of cages abutting one another in pairs at the rear side;
- a respective droppings receptacle, which is preferably formed by a droppings belt, for collection of poultry droppings extends under each of the cage rows;
- providing for drying the poultry droppings collected by the droppings receptacle are air fanning flaps which are arranged above the droppings receptacle in distribution at longitudinal spacings and are mounted on transverse axles and by means of which air currents sweeping over the droppings receptacle can be or are produced;
- pivot drives, which are preferably combined at least into groups, for pivotation of the air fanning flaps are associated therewith;
- the pivot drives have reciprocatingly drivable or driven drive elements, which are preferably configured with or as drive rods, particularly with or as pull and push rods, and which extend in longitudinal direction through the battery cage at a vertical spacing, preferably a small vertical spacing, from the transverse axes of the air fanning flaps and engage the air fanning flaps;
- each air fanning flap of the air fanning flaps is mounted on a transverse axle of the transverse axles, which is arranged in the region of an upper air fanning flap end of the respective air fanning flap;
- each air fanning flap has an upper, preferably plate-shaped, force transmission part and a lower, preferably plate shaped, fan part;
- the two cages of each double cage of the double cages are respectively separated from one another by at least one vertical longitudinal back wall, which preferably ends at a back wall spacing above the droppings receptacle;
- the two cages of each double cage have cage bases, which are preferably formed as grille floors, for the sitting, standing and/or movement of poultry, which bases have a plurality of droppings passage openings and respectively extend in a first transverse direction away from one another, particularly from a rear side towards a front side of the respective cage, preferably to drop down slightly.

Battery cages of that kind have become known from DE 37 15 735 A1, EP 0 387 819 A1 and DE 196 34 126 A1 of the Applicant. Although these have proved best in practice over many years it has emerged that these appear capable of improvement with respect to the living space, which is present per cage, of the poultry.

It is accordingly an object of the invention to improve the battery cage mentioned in the introduction, while providing advantageous possibilities for drying of the poultry droppings, in such a way that the poultry living space per cage is increased.

This object is fulfilled by the features of claim 1, particularly by the following features, in a mode and manner appearing unexpectedly simple:
- either the two cages of each double cage are respectively separated from one another by a common vertical longitudinal back wall which is arranged at a vertical spacing above the upper air-flap end of the air fanning flap associated with the respective double cage, wherein at least the fan part of this air fanning flap extends in a second transverse direction, preferably on both sides, out beyond the longitudinal back wall;
- or the two cages of each double cage are respectively separated from one another by a first vertical longitudinal back wall and by a second, preferably parallel, vertical longitudinal back wall, which are disposed at a transverse spacing from one another and which are respectively arranged at a vertical spacing above the upper air-flap end of the air fanning flap associated with the respective double cage, wherein at least the fan part of this air fanning flap extends in a second transverse direction out beyond the first longitudinal back wall and/or beyond the second longitudinal back wall;
- the fan part of the air fanning flap associated with the respective double cage is arranged under the cage bases of the two cages of the associated double cage and the upper air fanning flap end of each air fanning flap is either arranged similarly under the cage base of the two cages of the associated double cage or arranged in a double cage region from which the cage bases of two cages of the associated double cage extend away from one another in the first transverse direction or arranged at a height above a double cage region from which the cage bases of the two cages of the associated double cage extend away from one another in the first transverse direction, the height being smaller than a quarter of a minimum cage height of the respective cage above its cage base or smaller than a third of a minimum cage height of the respective cage above its cage base.

Through these measures, with air flow and droppings drying conditions which are advantageous as before, the poultry living space, which can be occupied to a large part by the poultry body, can be significantly increased. In particular, more free space for the poultry body is thereby created and more space for natural patterns of behaviour, such as, for example, stretching wings.

According to an advantageous embodiment it can be provided that the fan part of each air fanning flap as considered in the second transverse direction has a fan part width which is larger than a force transmission part width, as considered in the second transverse direction, of the force transmission part of the respective air fanning flap. The conditions for air flow and drying droppings can thereby be improved.

According to a particularly preferred variant of embodiment it can be provided that the fan part of each air fanning flap as considered in the second transverse direction extends out at both sides beyond the force transmission part of the respective air fanning flap respectively into a region which is arranged below a cage base part of the respective cage base of the cages of the respective double cage and above the droppings receptacle. The conditions for air flow and drying droppings can thereby be further improved.

Further details, advantages, features and aspects of the invention are also illustrated in the claims and in the following description part, in which an advantageous embodiment of the invention is described in more detail by way of drawings, in which:

Figure 1:
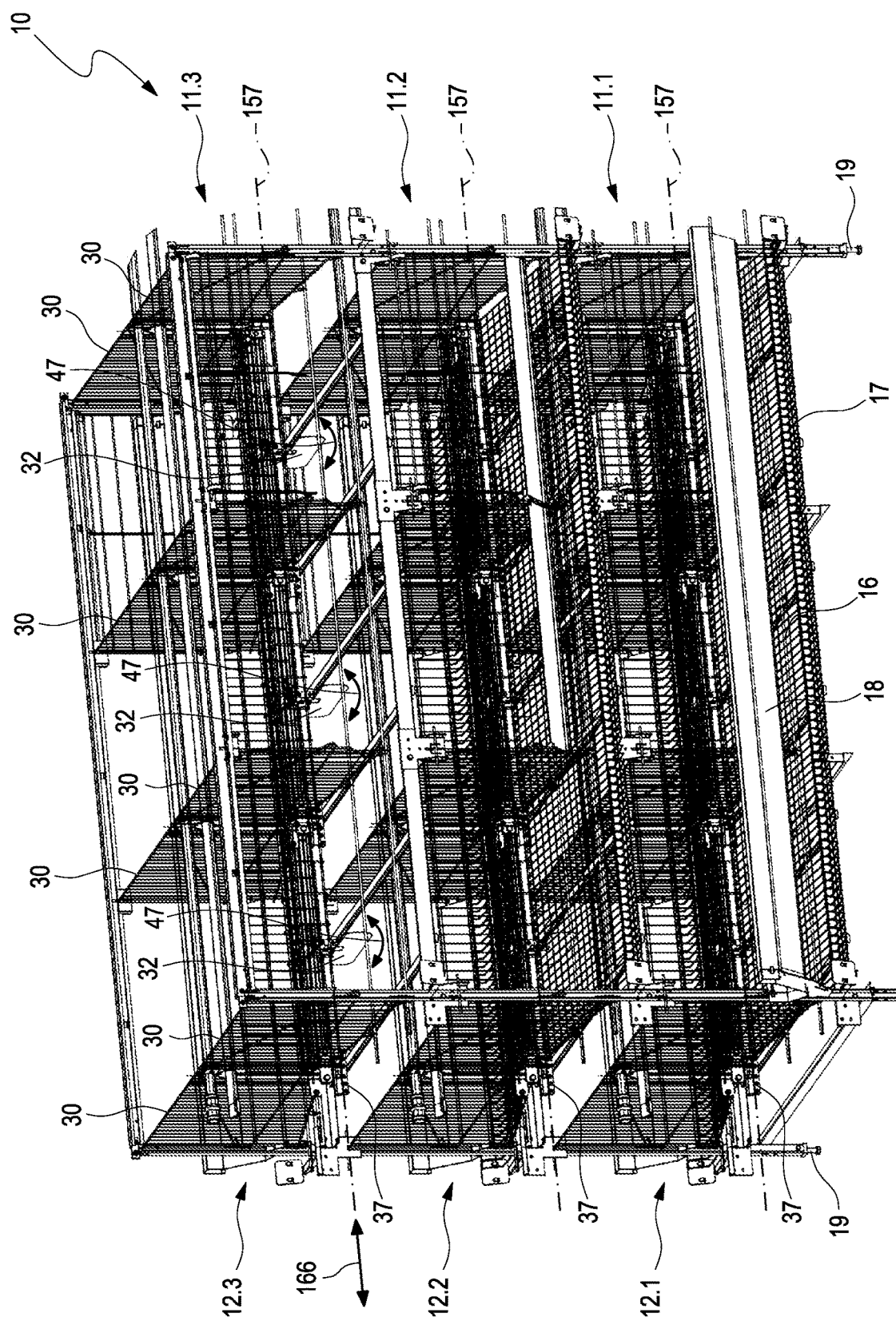
FIG. 1 shows a three-dimensional illustration of a battery cage part of a battery cage for poultry farming, wherein for reasons of illustration specific components have been partly or entirely omitted.
Figure 2:
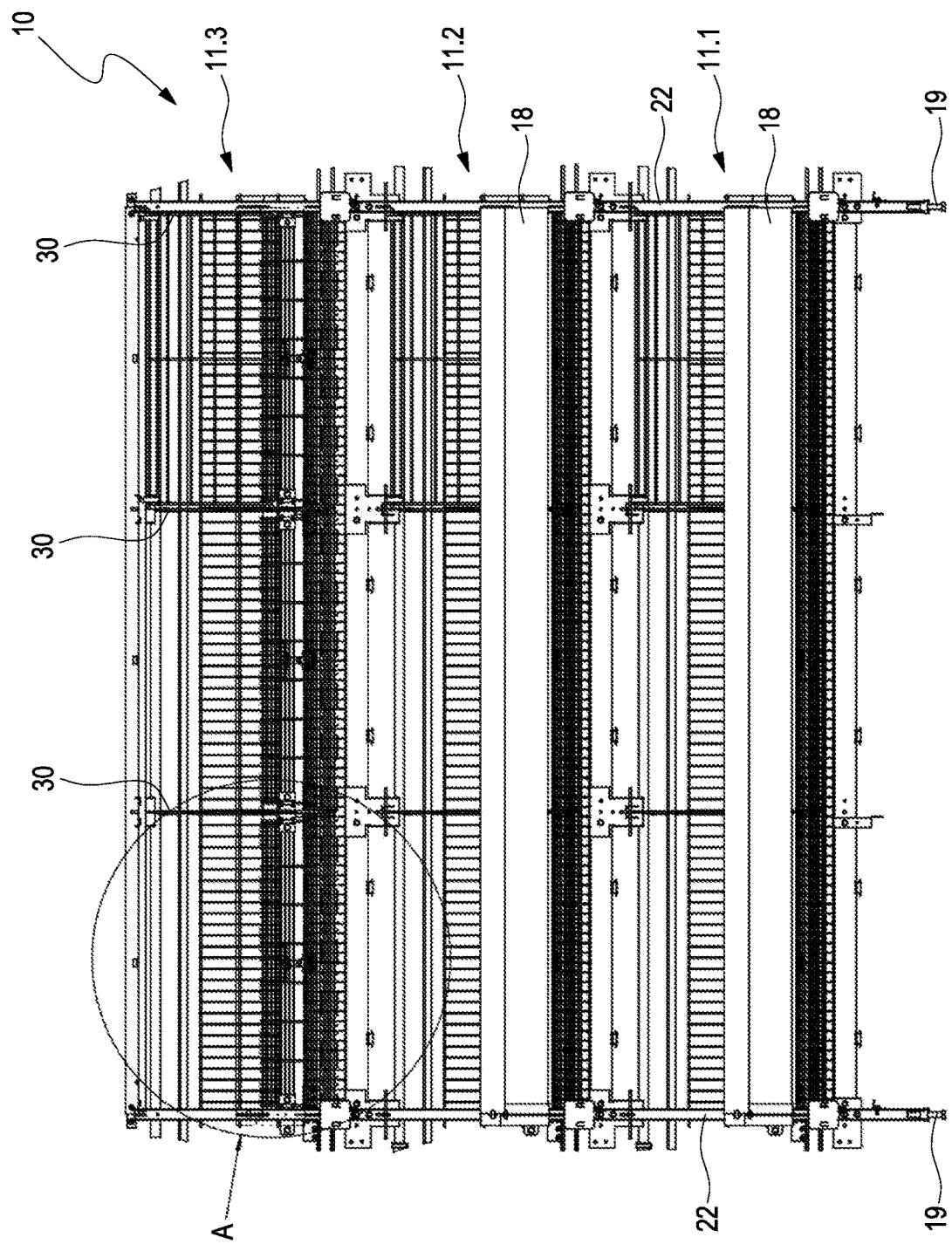
FIG. 2 shows a longitudinal side view of the battery cage part of the battery cage according to FIG. 1.
Figure 3:
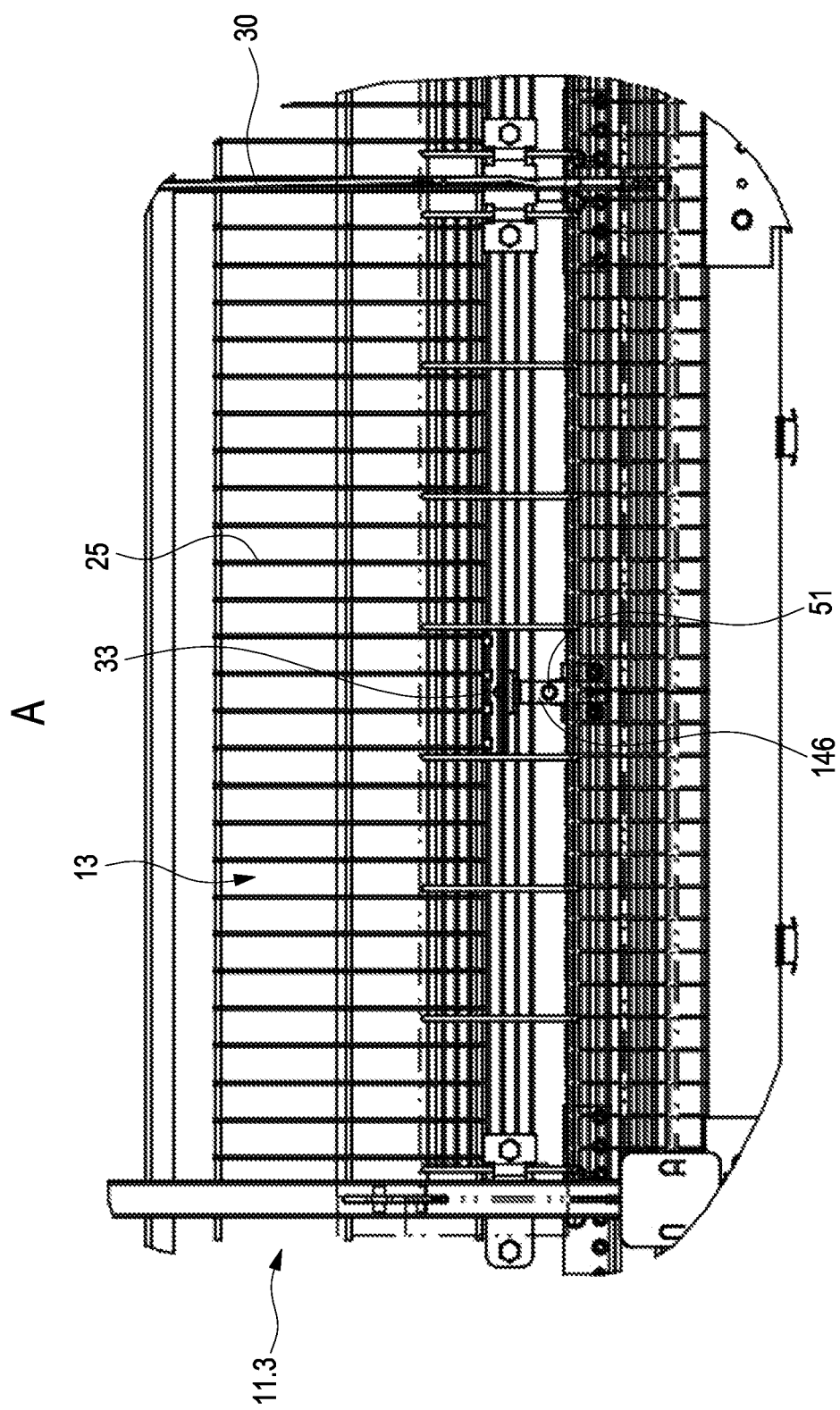
FIG. 3 shows an enlarged detail of FIG. 2.

The battery cage 10 has six horizontally extending cage rows 11; 11.1 to 11.3 which are arranged in three levels one above the other. In that case, the two cage rows 11 present in each level form a respective double cage row. Each double cage row comprises several cage enclosures 12.1 to 12.3 formed mainly with double cages 13-13. Each double cage 13-13 comprises two cages 13.

Each cage 13 is provided with a cage base 16, which drops down from its rear side 14 to its front side 15, in the form of a grille floor, which projects beyond the front side 15 and forms an egg collecting channel 17. The cage base 16 has a plurality of passage openings for droppings. The cage base 16 serves for, in particular, the sitting, standing and/or movement of poultry (not shown in the figures) kept in the cage 13. The cage bases 16 of the cages 13 abutting one another at the rear side extend away from one another in a first transverse direction 27. A food trough 18 is provided above the egg collecting channel 17 and runs, like the egg collecting channel 17, over the entire length of the respective double cage row 11, but can also be interrupted in the region of a drive element (not shown in the figures). The battery cage 10 is supported by way of feet 19 arranged in the region of the front sides 15 of the cages 13. Battery cages can also have more or less levels than three and more or less cage rows than six. They are usually many metres long, often 50 metres and more.

Each cage 11 has a droppings receptacle 20, for example a droppings belt, for reception of poultry droppings. The droppings receptacle 20 extends at a spacing below the oppositely inclined cage bases 16 of the two cages 13 of the individual cage rows 11 over the entire length of each level, but can also be interrupted in the region of the drive element. The droppings belt 20, which is constructed as an endless circulatory belt, collects the poultry droppings falling down through the grille floor 16, which is also termed cage base, and allows these to be discharged from time to time at its end. The droppings belt 20 has an upper run 20.1 and a lower run 20.2. The upper run 20.1 rests on belt carriers 21, which each extend in a transverse direction between two vertical supports 22 adjacent in the transverse direction and which are fastened thereat by their ends. The lower run 20.2 rests on transverse beams 29, which can also be termed side parts and which similarly extend in a transverse direction between two vertical supports 22 adjacent in the transverse direction and which are fastened thereat by their ends.

Each cage 13 is bounded by, in particular, the following components: downwardly by a cage base 16, forwardly by a vertical longitudinal front wall 25 and the horizontal food trough 18, rearwardly by a vertical longitudinal back wall 26, towards both sides by a vertical first transverse side wall 30 and a vertical second transverse side wall 30 and downwardly by the lower run 20.2 of the circulatory droppings belt 20. These components bound a living space 31 for poultry in the respective cage 13. The longitudinal front wall 25, the longitudinal back wall 26 and the cage base 16 are here each constructed as a grille.

The individual cages 13 of the respective double cages 13-13 abut one another at the rear side and are separated from one another at that place by the common vertical longitudinal back wall 26. The common vertical longitudinal back wall 26 thus forms a part of a rear side 14 of each of the two cages 13 of each double cage 13-13. The common vertical longitudinal back wall 26 serves as a separation wall. The respective longitudinal back wall 26 extends in the longitudinal centre plane 24 of the battery cage 10 through the entire associated cage row 11, with the exception of an interruption in the region of the drive element. The vertical longitudinal back wall 26 extends over more than half a minimum height 48 of the respective cage 13. The vertical longitudinal back wall 26 goes over at its upper end into a water collecting channel 34. This extends in the longitudinal centre plane 24 through the entire cage row 11. However, the water collecting channel can also be covered or interrupted in the region of the drive element. Arranged at a spacing above the water collecting channel 34 is a water pipe 35 which extends parallel thereto. The water pipe 35 also extends in the longitudinal centre plane 24 through the entire cage row 11. The water pipe 35 can also be covered or interrupted in the region of the drive element. The water pipe 35 is provided at specific longitudinal spacings with connection nipples 36 displaceable relative thereto. The connection nipples 36 can be actuated by means of a beak of poultry kept in a cage 13, whereby water can flow out of the water pipe 35 into the water collecting channel 34.

Figure 4:
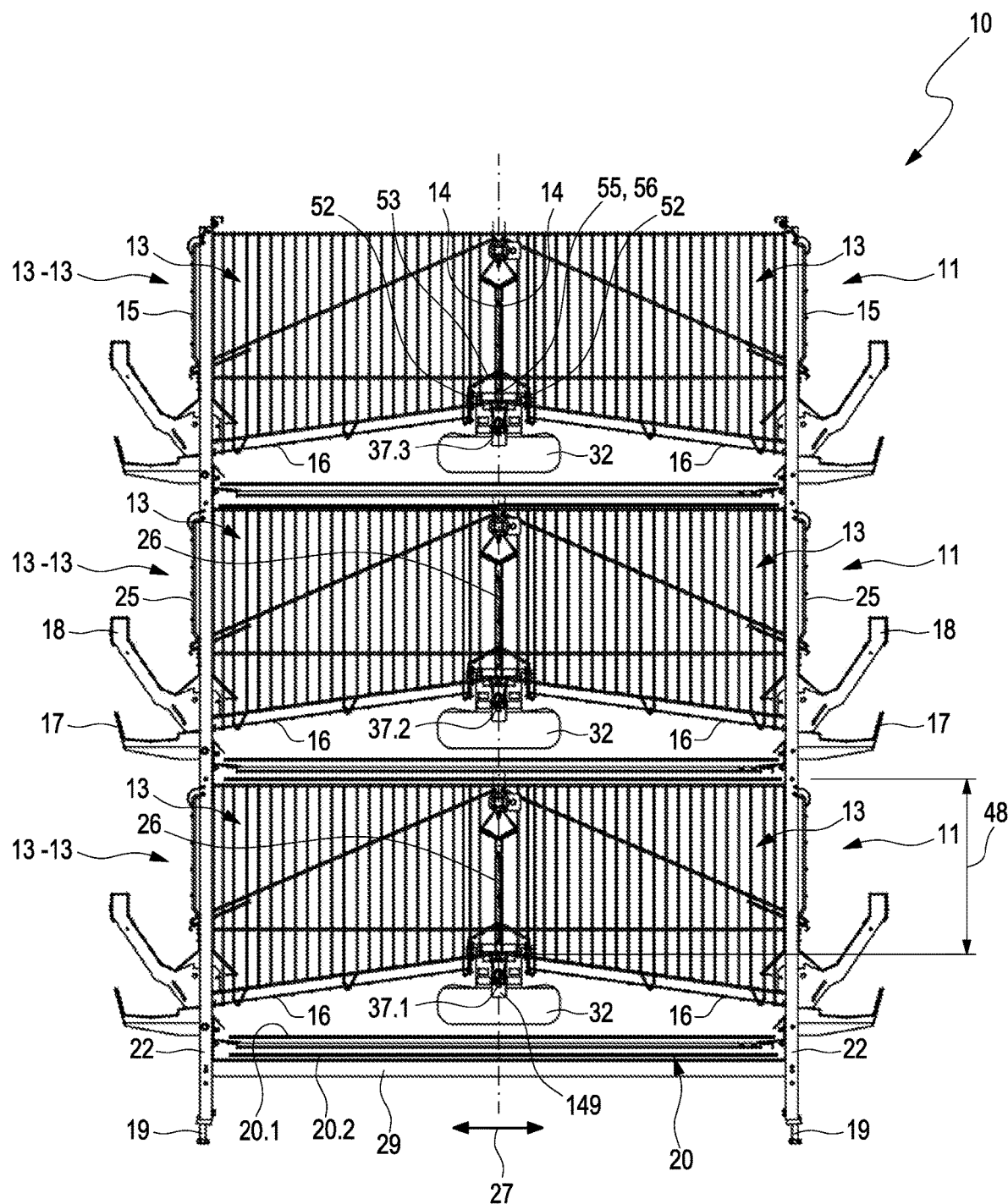
FIG. 4 shows an end transverse side view of the battery cage part of the battery cage according to FIG. 1.

Each double cage row 11 having double cages 13-13 is provided with an air flow device 23 which—as can be inferred from FIGS. 4 and 5—is arranged substantially on either side of the longitudinal centre plane 24 of the battery cage 10 partly between the cages 13 adjacent to one another at the rear side, but to large extents below the cages 13 adjacent to one another at the rear side. The air flow device 23 comprises several air fanning flaps 32. Each air fanning flap 32 is pivotably mounted by means of a transverse axle 33, the transverse axle ends of which are supported at or mounted on vertical cover elements 52, which are arranged at a horizontal spacing from and parallel to one another, of a cover 53. The cover elements 52 form a part of a cover grille 53 for covering the respective transverse axle 33 and a part of a respective force transfer part 146 of the respective air fanning flap 32. Provided in each level is a cover grille 53 which extends in the longitudinal centre plane 24 and in longitudinal direction through the entire double cage row. Each cover grille 53 extends, starting from its vertical cover elements 52, obliquely upwardly to the respective vertical longitudinal back wall 26. The said part of the force transmission part 146 has a small gap spacing from the respective cover elements 52 of the cover grille 53.

Figure 5:
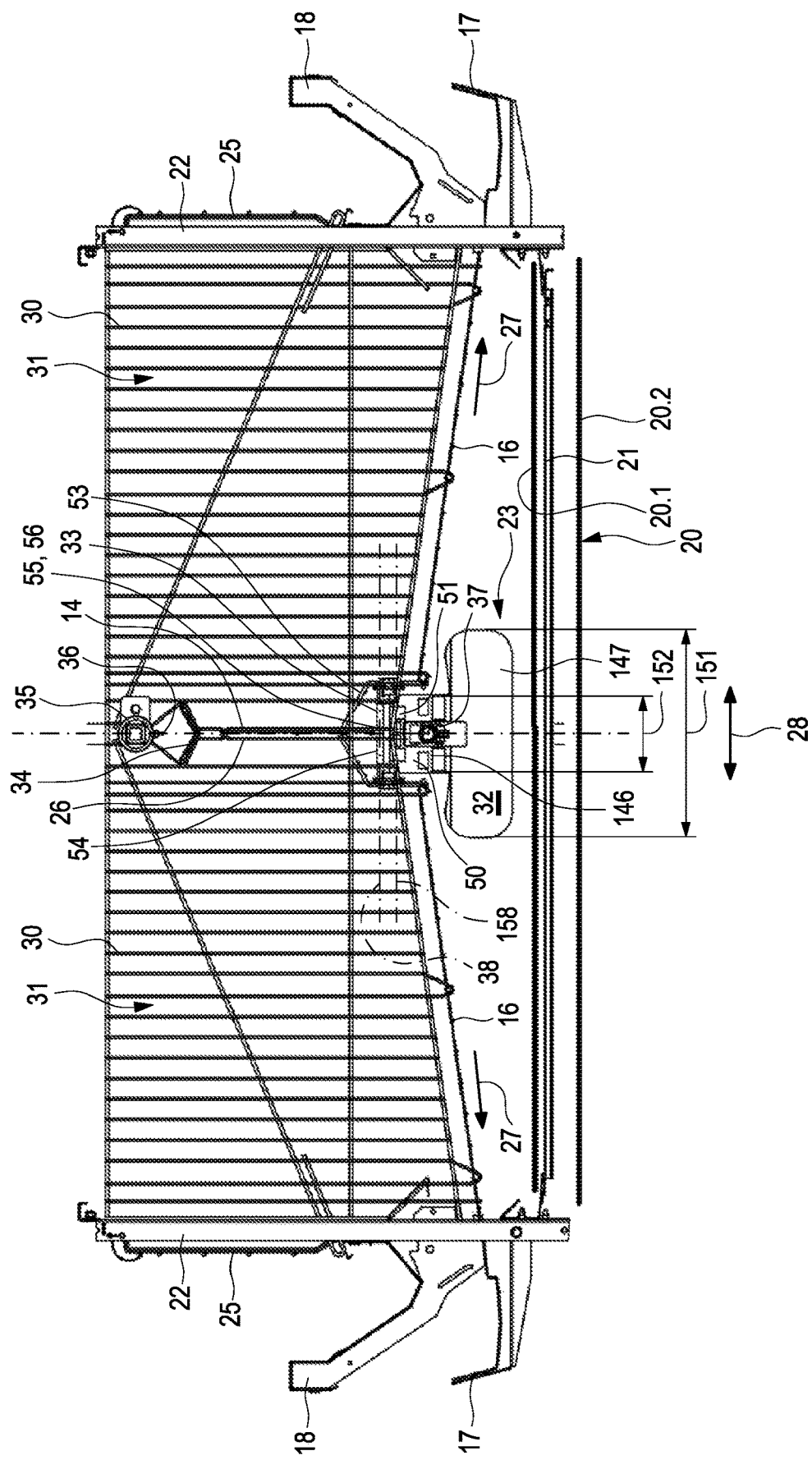
FIG. 5 shows an enlarged detail of the cage, which is shown at the top in FIG. 4, of a double cage.

The design and mounting of the air fanning flap 32 is evident particularly from FIG. 5. The air fanning flap 32 has an upper force transmission part 146 and a lower fan part 147. Advantageously, the force transmission part 146 and the fan part 147 are formed to be detachable from one another. The fan part 147 can thereby be easily demounted or exchanged and can also be adapted in optimum manner, largely with retention of all usual movable installation parts, with respect to its length and/or its material characteristic and vibration characteristic. The air fanning flap 32 consists of material resistant to the mechanical/chemical/climatic conditions in battery cages. The upper force transmission part 146 consists of a relatively stiff synthetic material, particularly glassfibre-reinforced polyamide 6.6. The lower fan part 147 consists of a relatively flexible material which is, however, characterised by sufficient intrinsic stiffness, particularly a thermoplastic elastomer (TPE) or cross-linked polyolefin. In order to mount the air fanning flap 32, this has at the upper end of the force transmission part 146 and consequently at its upper end 54 the transverse axle 33 extending in transverse direction of the air fanning flap 32 parallel to the fanning drive axle 51. As shown in FIG. 5, this is fastened at both ends to the vertical cover elements 52 of the cover grille 53. The force transmission part 146 has a passage opening 149, which extends in longitudinal direction of the air fanning flap 32, for passage of a drive rod 37 also termed drive element and for reception of a connecting element 50. The connecting element 50 for the most part embraces on the one hand the drive rod 37 and on the other hand the fan drive axle 51. As a result, on the one hand a mechanically positive, secure connection between the connecting element 50 and the drive rod 37 or between the connecting element 50 and the fan drive axle 51 can be achieved and on the other hand mounting and demounting are possible in simple manner.

Instead of the passage openings through the respective force transmission part 146 various other constructions in which sufficiently large free spaces for movement of the drive rods are provided are also conceivable. For example, air fanning flaps divided in longitudinal direction can be provided. Alternatively, it may also be possible to provide two air fanning flaps which are respectively mounted on a common transverse axle and arranged at a mutual spacing and between which the drive rods pass, in which case the two adjacent air fanning flaps are driven in common.

The connecting element 50 is connected with the force transmission part 146 by way of the fan drive axle 51, which is mounted therein to be rotationally movable and which extends parallel to the transverse axle 33 at a small spacing below this, wherein the associated rotational axes 158 and 38 have a mutual spacing. A lower fastening part of the connecting element 50 largely embraces the drive rod 37, which extends there through, and is firmly, but detachably, connected with the drive rod 37.

In the mounted state the drive rod 37 extends below the fan drive axle 51, wherein the central longitudinal axis 157 of the push and pull rod 37 and the rotational axis 158 of the drive axle 51 have a mutual spacing and extend perpendicularly to one another.

It is not shown in the figures that provided in the centre of each level with double cage rows and substantially within a cage enclosure is a respective drive element for pivot drives, which comprises a drive motor. For reasons of convenience or to enable a combination of individual battery cages the drive element can, however, also be arranged outside a cage enclosure. The pivot drives, which are formed with drive rods 37 (pull or push rods 37.1 to 37.3), for pivoting the air fanning flaps 32 engage at both sides of the drive element. A respective individual air fanning flap 32 is associated with each double cage 13-13. However, it will be obvious that more than one air fanning flap can also be associated with each double cage.

In order to pivot the air fanning flap 32, a reciprocating movement, which is indicated by the double arrow 166, of the respective drive rod 37 is achieved with the help of the drive element, which movement is passed on by way of the connecting element 50 to the fan drive axle 51 and leads to the reciprocating movement, which is indicated by the double arrow 47, of the respective air fanning flap 32 about the respective transverse axle 33.

The vertical longitudinal back wall 26 is arranged at a vertical spacing above the upper air-flap end of the air fanning flap 32 associated with the respective double cage 13-13. The force transmission part 146 and also the fan part 147 of each air fanning flap 32 extend in a second transverse direction 28 on either side out beyond the respectively associated vertical longitudinal back wall 26. The fan part 147 of the air fanning flap 32 associated with the respective double cage 13-13 is arranged below the cage base 16 of the cages 13 of the associated double cage 13-13. The upper air fanning flap end 54 of each air fanning flap 32 is arranged in a double cage region 55 at a small vertical spacing above an adjacency location 56 at which or in which the cage bases 16 of the cages 13 of the associated double cage 13-13 adjoin one another at the rear side and starting from the cage base or bases 16 of the cages 13 of the associated double cage 13-13 extend away from one another in the first transverse direction 27. The fan part 147 of the respective air fanning flap 32 extends, as considered in the second transverse direction 28, on either side out beyond the force transmission part 146 respectively into a region which is arranged below a cage base part of the respective cage base 16 of the cages 13 of the respectively associated double cage 13-13 and above the upper run 20.1 of the droppings belt 20. The fan part 147 of each air fanning flap 32 has, as considered in the second transverse direction 28, a fan part width 151 which is larger than a force transmission part width 152 of the force transmission part 146 of the respective air fanning flap 32 as considered in the second transverse direction 28. The fan part width 151 is preferably greater than twice the force transmission part width 152 or greater than 2.5 times the force transmission part width 152.

The cycle of function and movement and the co-operation of the individual functional parts of the battery cage 10 are described in the following:

A pushing or pulling translational movement of the drive rods 37 is achieved with the help of the drive motor (not shown in the figures) of the drive element. This movement is transferred by way of the respective connecting element 50 between the drive rod 37 and the fan drive axle 51 to the respective air fanning flap 32. Due to the fact that each air fanning flap 32 is mounted at its upper end 54 on the transverse axle 33, which is stationary relative to the fan drive axle, to be pivotable about this axle and in conjunction with the connecting element 50 mounted to be rotationally movable parallel to the fan drive axle 51 about the rotational axis 158, the air fanning flap 32 executes a constrainedly controlled reciprocating movement in the direction of the double arrow 47.

Due to the special constructional design and arrangement of the connecting element 50 between the drive rod 37 and the fan drive axle 51, in the case of translational reciprocating movement of the drive rods 37 a local bending movement is generated in these in the region of each connecting element 50 and can lead to decoupling and/or damping and thus suppression of undesired resonance vibrations.

An important part of the description is reproduced in the following: The battery cage (1) comprises at least two horizontal cage rows (11; 11.1, 11.2, 11.3), which are formed with cage enclosures (12.1, 12.2, 12.3) and are arranged adjacent to one another, wherein a plurality of the cage enclosures (12.1, 12.2, 12.3) is formed with double cages (13-13) consisting of cages (13) abutting one another in pairs at the rear side and wherein extending below the cage rows (11; 11.1, 11.2, 11.3) is a respective droppings receptacle (20) above which are arranged air fanning flaps (32), which are distributed at longitudinal spacings and which each have an upper force transmission part (146) and a lower fan part (147) and are mounted on a transverse axle (33), which is arranged in the region of an upper air fanning flap end (54) of the respective air fanning flap (32), and wherein associated with the air fanning flaps (32) are pivot drives which have reciprocatingly drivable drive rods (37; 37.1, 37.2, 37.3), which extend in longitudinal direction through the battery cage (10) at a spacing from the transverse axles (33) and engage the air fanning flaps (32), and wherein the two cages (13) of each double cage (13-13) have cage bases (16) which extend away from one another in a transverse direction (27), and wherein the two cages (13) of each double cage (13-13) are respectively separated from one another by a common vertical longitudinal back wall (26) which is arranged at a vertical spacing above the upper air-flap end (54), and wherein the fan part (147) of the air fanning flap (32) is arranged under the cage base (16) of the cages (13) of the associated double cage (13-13) and wherein the air fanning flap end (54) is arranged in a double cage region (55), from which the cage bases (16) extend away from one another in the transverse direction (27).

REFERENCE NUMERAL LIST 10 battery cage
11 cage row
11.1 cage row
11.2 cage row
11.3 cage row
12.1 cage enclosure
12.2 cage enclosure
12.3 cage enclosure
13 cage
13-13 double cage
14 rear side
15 front side
16 cage base/grille floor
17 egg collecting channel
18 food trough
19 foot
20 droppings receptacle/droppings belt
20.1 upper run
20.2 lower run
21 belt carrier
22 vertical support
23 air flow device
24 longitudinal centre plane
25 longitudinal front wall
26 longitudinal back wall
27 first transverse direction
28 second transverse direction
29 transverse beam
30 transverse side wall
31 living space
32 air fanning flap
33 transverse axle
34 water collecting trough
35 water pipe
36 connection nipple
37 drive element/drive rod (pull or push rod)
37.1 drive element/drive rod (pull or push rod)
37.2 drive element/drive rod (pull or push rod)
37.3 drive element/drive rod (pull or push rod)
38 rotational axis of 33
47 double arrow
48 minimum (cage) height of 13
50 connecting element
51 fan drive axle
52 (vertical) cover element
53 cover/cover grille
54 upper (air fanning flap) end
55 double cage region
56 adjacency location
146 force transmission part
147 fan part
149 passage opening
151 fan part width
152 force transmission part width
157 longitudinal axis of 37
158 rotational axis of 51
166 double arrow

The invention claimed is:

1. A battery cage for poultry farming with the following features:
   at least two horizontal cage rows (11; 11.1, 11.2, 11.3) formed with cage enclosures (12.1, 12.2, 12.3) are arranged adjacent to one another;
   a plurality of the cage enclosures (12.1, 12.2, 12.3) is formed with double cages (13-13) consisting of cages (13) abutting one another in pairs at the rear side;
   a respective droppings receptacle (20) for collection of poultry droppings extends under each of the cage rows (11; 11.1, 11.2, 11.3);
   providing for drying the poultry droppings collected by the droppings receptacle (20) are air fanning flaps (32) which are arranged above the droppings receptacle (20) at longitudinal spacings and are mounted on transverse axles (33) and by means of which air currents sweeping over the droppings receptacle (20) can be or are produced;
   pivot drives for pivotation of the air fanning flaps (32) are associated therewith;
   the pivot drives have reciprocatingly drivable or driven drive elements (37; 37.1, 37.2, 37.3) which extend in longitudinal direction through the battery cage (10) at a vertical spacing from the transverse axles (33) of the air fanning flaps (32) and engage the air fanning flaps (32);
   each air fanning flap (32) of the air fanning flaps (32) is mounted on a transverse axle (33) of the transverse axles (33), which is arranged in the region of an upper air fanning flap end (54) of the respective air fanning flap (32);
   each air fanning flap (32) has an upper force transmission part (146) and a lower fan part (147);
   the two cages (13) of each double cage (13-13) of the double cages (13-13) are respectively separated from one another by at least one vertical longitudinal back wall (26);
   the two cages (13) of each double cage (13-13) have cage bases (16) for the sitting, standing and/or movement of poultry, which bases have a plurality of droppings passage openings and respectively extend away from one another in a first transverse direction (27);
   comprising the following features:
   either the two cages (13) of each double cage (13-13) are respectively separated from one another by a common vertical longitudinal back wall (26) which is arranged at a vertical spacing above the upper air-flap end (54) of the air fanning flap (32) associated with the respective double cage (13-13), wherein the fan part (147) of this air fanning flap (32) extends, as considered in a second transverse direction (28), on either side out beyond the force transmission part of this air fanning flap and extends in the second transverse direction on either side out beyond the longitudinal back wall (26);

or the two cages of each double cage are respectively separated from one another by a first vertical longitudinal back wall and by a second vertical longitudinal back wall, which are disposed at a transverse spacing from one another and which are respectively arranged at a vertical spacing above the upper air-flap end of the air fanning flap associated with the respective double cage, wherein the fan part of this air fanning flap extends, as considered in a second transverse direction, on either side out beyond the force transmission part of this air fanning flap and extends in the second transverse direction on either side out beyond the respectively associated longitudinal back wall;

the fan part (147) of the air fanning flap (32) associated with the respective double cage (13-13) is arranged under the cage base (16) of the two cages (13) of the associated double cage (13-13) and the upper air fanning flap end (54) of each air fanning flap (32) is either arranged similarly under the cage bases of the two cages of the associated double cage or arranged in a double cage region (55) from which the cage bases (16) of two cages (13) of the associated double cage (13-13) extend away from one another in the first transverse direction (27)

or arranged at a height above a double cage region (55) from which the cage bases (16) of the two cages (13) of the associated double cage (13-13) extend away from one another in the first transverse direction (27), the height being smaller than a quarter or a third of a minimum cage height (48) of the respective cage (13) above its cage base (16).

2. The battery cage according to claim 1, wherein the fan part (147) of each air fanning flap (32) as considered in the second transverse direction (28) has a fan part width (151) which is larger than a force transmission part width (152), as considered in the second transverse direction (28), of the force transmission part (146) of the respective air fanning flap (32).

3. The battery cage according to claim 1, wherein the fan part (147) of each air fanning flap (32) as considered in the second transverse direction (38) extends out at both sides beyond the force transmission part (146) of the respective air fanning flap (32) respectively into a region which is arranged below a cage base part of the respective cage base (16) of the cages (13) of the respective double cage (13-13) and above the droppings receptacle (20).

* * * * *